Figure 1:
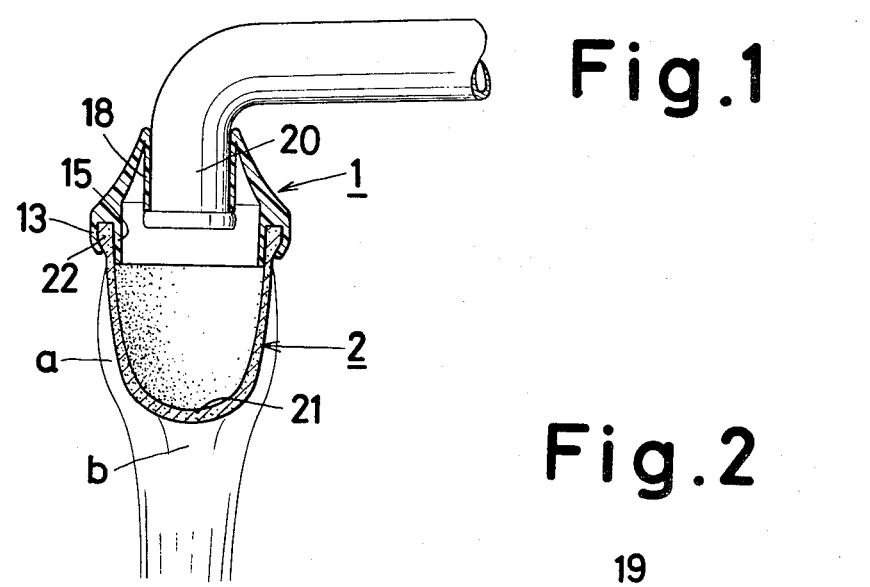

PATENTED DEC 26 1972 3,707,236

INVENTOR.

BY

United States Patent [19] [11] 3,707,236
Takebayasi [45] Dec. 26, 1972

[54] ANTI-SPLASH TAP NOZZLE
[72] Inventor: Hisatomo Takebayasi, Yokohama, Japan
[73] Assignee: Kurita Water Industries Ltd., Osaka, Japan
[22] Filed: Aug. 11, 1971
[21] Appl. No.: 170,835

[52] U.S. Cl. .................................210/449, 210/460
[51] Int. Cl. ..............................................B01d 27/00
[58] Field of Search..55/DIG. 16; 210/448, 449, 452, 210/460, 463, 496; 261/DIG. 22

[56] References Cited

UNITED STATES PATENTS 2,100,165   11/1937   Holmberg et al. ................210/449 X
2,210,846   8/1940    Aghnides ..........................210/449 X
2,664,278   12/1953   Aghnides ..........................210/449 X

OTHER PUBLICATIONS

Porex porous plastics, Porex Materials Corp., 7380 Bohannon Road, Fairburn(Atlanta) Georgia, 30213. 1970.

Primary Examiner—Reuben Friedman
Assistant Examiner—R. W. Burks
Attorney—Kurt Kelman

[57] ABSTRACT

An anti-splash tap nozzle comprising a cap-shaped joint provided with a soft cylinder destined to clamp on the tap outer surface, and a filter provided with a convex head and made of a hard material having a uniform continuously foamed structure.

7 Claims, 2 Drawing Figures

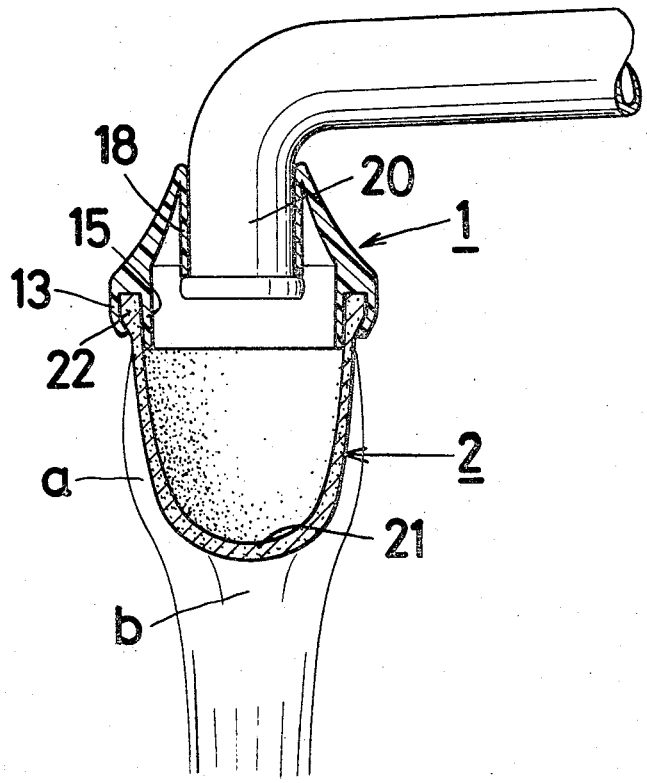

3,707,236

ANTI-SPLASH TAP NOZZLE

This invention relates to an anti-splash tap nozzle provided with a porous hard filter, the head of which is shaped into a semispherical, convex surface, the said anti-splash nozzle being capable of, when fixed in use to the tap by means of a joint, reducing the pressure of the water coming out from the tap, and causing the water to flow in a uniform streamlined flow thereby preventing the water from splashing when it hits the sink bottom or objects being washed or rinsed in the sink. To acquire the said anti-splash effect, the filter should present a high resistance to the passage of water so as to reduce the water pressure; should be able to diffuse the water pressure uniformly; and should have a convex head to allow water to flow along to the outer wall of the filter, so that the water may flow down in the form of a coherent stream from the center of the nozzle even in cases of rapid water flow or high water pressure. Furthermore, since the water which passes down through the filter is used directly for cooking and drinking, it should be kept clean and pure for sanitary purposes.

The filters of the nozzles used hitherto have been made of soft synthetic resins which, since they have a sponge-like structure of continuous foam, are apt to become deformed by the pressure of the water coming out from the tap to which they are fixed, and thus to become unable to make the water flow uniform and streamlined. Such nozzles are therefore unable to prevent the water from splashing. Moreover, they are unsanitary since the characteristics of the sponge-like material causes them to absorb atmospheric dust which mixes with the water.

The principal object of this invention is to provide a tap nozzle with a filter made of a hard porous plastic material, for example, a continuously foamed structure made of a porous thermoplastic resin obtained from acrylonitrile and styrene copolymers, aiming at overcoming the weak points of conventional nozzles using a soft sponge-like filter.

Another object of the present invention is to provide a tap nozzle which, although its filter is made of hard plastic and is therefore undistortable, can be easily connected to a joint and is suitable for mass production.

Still another object of this invention is to provide a tap nozzle wherein there is no fear of separation of the nozzle from the tap and of the filter from the nozzle, since the higher the water pressure inside the nozzle, the stronger becomes the connection between the tap and the joint as well as between the joint and the filter.

Figure 2:
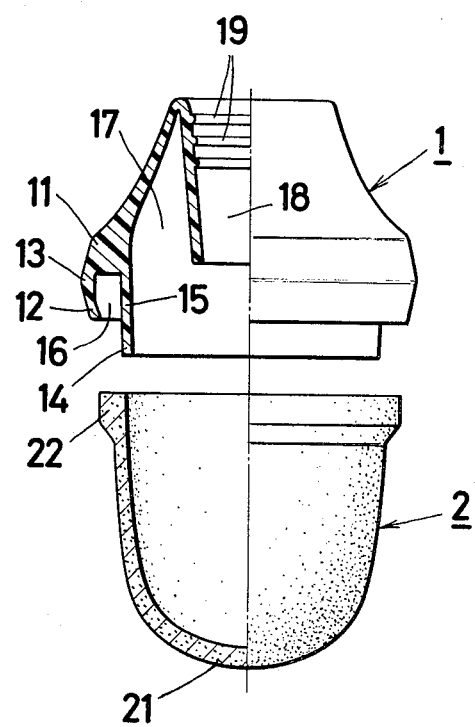

The other objects of this invention will become apparent from the following description of the embodiment which is illustrated in the accompanying drawing, in which:

FIG. 1 shows a vertical sectional view of the nozzle adapted to a water tap regulating the water into a uniform streamlined flow flowing down from the tap; and FIG. 2 shows a side view partially in section of a joint and a filter in a separated state before assemblage.

As shown in the FIG. 1, the anti-splash tap nozzle according to this invention has in general the form of a capped acorn, the joint 1 being the cap and the filter 2 being the acorn shell.

The joint 1 is made of soft polyvinyl chloride or of other soft plastic material, and has on its outer peripheral wall 11 a hem 12 directed radially inward in a bent axial direction, an external skirt 13 directed downward, an internal skirt 15 directed downward, having an extension 14 directed axially and protruding beyond the hem 12 of the external skirt 13, a circumferential hollow space 16 defined by the two skirts 13, 15, opened downward, and a cylindrical part 18 folding down from the top of the joint 1 within the hollow space 17 surrounded by the internal skirt 15. The joint 1 is fixed to the tap 20 by engaging the cylindrical part 18 with the outer surface of the tap 20. For this purpose, non-slipping grooves 19 can be made, if necessary, on the inner circumference of the cylindrical part 18 which comes into contact with the outer surface of the tap.

The filter 2 has a semi-spherical head 21 in the form of a short blind cylinder, and an upper edge 22 which can be inserted into the hollow space 16 defined by the external skirt 13 and the internal skirts 15 of the joint 1. As described above, the filter 2 is of continuously foamed structure, constituted of a hard plastic material, and has the integral protruding edge 22 around the outer surface of its upper circumference, which edge tightly fills in the hollow space 16 when inserted thereinto and prevents it from slipping down from the lower hem 12 of the external skirt 13. Consequently, the inner circumference of the upper edge of filter 2 fits snugly over the outer circumference of the internal skirt 15.

In assembly of the filter 2 and the joint 1, the upper inner edge of the filter 2 is inserted over the outer surface of the extension 14 of the internal skirt 15 and the upper edge 22 of the filter 2 is pushed into the hollow space 16, using the inner skirt 15 as a guide while rolling the external skirt 13 up. A bonding agent may be applied on the inner surface of the hollow space 16 in order to bind the latter to the upper edge 22 of the inserted filter 2.

When the filter 2 and the joint 1 are assembled, the outer surface of the internal skirt 15 keeps good contact with the inner wall of the upper edge 22 of the filter 2, and the lower hem 12 bending inward and down from the external skirt 13 clamps firmly on the protruding edge 22. Accordingly, when the joint is adapted to the tap 20 by insertion of the cylindrical part 18 over the tap 20, and when water is turned on, the skirt 15 is forced by the pressure of the water filling the space 17 against the inner surface of the filter 2, preventing the filter 2 from slipping out from the joint 1. Moreover, the said water pressure, acting on the outside of the cylindrical part 18, forces the latter strongly against the tap 20, thus also preventing the joint 1 from separating from the tap 20.

Since the filter 2 is not deformed by the said water pressure, the water flowing out of the tap 20 down in the nozzle interior, is uniformly dispersed over the entire surface of the filter 2 exposed under the joint 1, and is completely reduced in its force by passing through the high resistant porous surface of the filter 2. The water passing out from the lateral parts and from the parts around the filter head 21 flows along the filter wall, forming the flow *a* which unites with the vertical flow *b* formed by water passing through the central part of the filter head, thus resulting in a uniform streamlined flow of water flowing down through the air. Consequently, water will not splash when it hits the sink bottom or objects being washed in the sink, even when the tap is very high above the sink.

And, since the filter is made of hard non-absorbing material, it does not, when unemployed, absorb dust which might mix with the water when used.

What is claimed is:

1. An anti-splash tap nozzle comprising a cap-shaped joint provided with a soft cylinder destined to clamp on the tap outer surface, and a filter provided with a convex head and made of a hard material having a uniform continuously foamed structure.

2. An anti-splash tap nozzle according to claim 1, having a joint provided, on the outer part, with an external and an internal skirt directed axially downward, the upper edge of the filter being inserted into a hollow space defined by the two skirts and opening downward.

3. An anti-splash tap nozzle according to claim 1, provided with an external skirt having a lower hem bent radially inward, and a filter having an integral upper protruding edge which fills in the space between the two external and internal skirts and which is capable of being clamped on by the lower hem of the external skirt bent radially inward.

4. An anti-splash tap nozzle according to claim 2, provided with an internal skirt having a lower edge extending downward beyond the lower hem of the external skirt.

5. An anti-splash tap nozzle according to claim 1, provided with a cylinder for clamping on the outer surface of the tap, said cylinder being folded at and extending from the joint top, inside the space surrounded by the internal skirt.

6. An anti-splash tap nozzle according to claim 1, wherein the cap-shaped joint is made of soft polyvinyl chloride.

7. An anti-splash tap nozzle according to claim 1, wherein the filter is a uniform continuously foamed structure made of thermoplastic resin of acrylonitrile-styrene copolymer.

* * * * *